United States Patent
Yuasa

(10) Patent No.: US 7,606,971 B2
(45) Date of Patent: Oct. 20, 2009

(54) STORAGE CONTROL APPARATUS AND EXTERNAL STORAGE APPARATUS

(75) Inventor: Kentarou Yuasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 221 days.

(21) Appl. No.: 11/059,588

(22) Filed: Feb. 17, 2005

(65) Prior Publication Data

US 2006/0101215 A1  May 11, 2006

(30) Foreign Application Priority Data

Nov. 9, 2004  (JP) .............................. 2004-325161

(51) Int. Cl.
G06F 12/00 (2006.01)
G06F 12/14 (2006.01)
G06F 12/16 (2006.01)

(52) U.S. Cl. .................. 711/114; 711/146; 711/120; 711/156; 709/232; 714/6; 714/54; 714/758; 714/E11.001; 714/E11.004

(58) Field of Classification Search .................. None
See application file for complete search history.

(56) References Cited

U.S. PATENT DOCUMENTS 5,909,334 A * 6/1999 Barr et al. ................. 360/53

2005/0190787 A1 * 9/2005 Kuik et al. ................. 370/466
2005/0262263 A1 * 11/2005 Hathaway et al. .......... 709/232

FOREIGN PATENT DOCUMENTS

| JP | 5-224968 | 9/1993 |
| JP | 10-133962 | 5/1998 |
| JP | 2001-175582 | 6/2001 |
| JP | 2001-318766 | 11/2001 |
| JP | 2002-23966 | 1/2002 |
| JP | 2002-247013 | 8/2002 |

OTHER PUBLICATIONS

Communication from the Japanese Patent Office mailed on Feb. 10, 2009 in the corresponding Japanese patent application.

* cited by examiner

Primary Examiner—Sanjiv Shah
Assistant Examiner—Midys Rojas
(74) Attorney, Agent, or Firm—Staas & Halsey LLP

(57) ABSTRACT

A storage control apparatus includes a plurality of temporary storage units that are managed in a redundant manner by data mirroring, and temporarily store data input from an outside source; a temporary-storage control unit that controls input and output of the data to the temporary storage units; and a mirroring control unit that controls the data mirroring between the temporary storage units, checks, when performing the data mirroring, validity of the data stored in a temporary storage unit of a mirroring source, and executes, when the validity of the data has been confirmed, the data mirroring.

5 Claims, 14 Drawing Sheets

STORAGE CONTROL APPARATUS AND EXTERNAL STORAGE APPARATUS

BACKGROUND OF THE INVENTION

1) Field of the Invention

The present invention relates to a technology for ensuring validity of data in an external storage apparatus.

2) Description of the Related Art

In recent years, with various types of data being converted into electronic form and handled on computers, a disk array apparatus serving as an external storage apparatus capable of efficiently storing a large amount of data independently from the computers has become more important. By the adoption of redundant arrays of inexpensive disks (RAID) technologies, such a disk array apparatus is able to provide increased reliability over that of a simple disk apparatus. Also, with a cache being generally incorporated, the disk array apparatus allows data access time to be shortened.

In the RAID technologies, reliability is increased by using a scheme of storing the same data on a plurality of disks (RAID-1), a scheme of storing parity information in disks on a decentralized manner (RAID-5), or other schemes. Most of the current disk array apparatuses have adopted a scheme of ensuring reliability by adding check code to data.

This is done by adding, to a data block of 512 bytes, cyclic redundancy check (CRC) code calculated from the data and a block ID indicative of data position information. Such CRC code and block ID may be collectively referred to as block check code (BCC), acting as check code for the data block. The CRC is obtained by performing a predetermined calculation on the data of 512 bytes and a predetermined value called a "seed". Also, the block ID is defined for a byte data block of first 512 bytes. For a data block of the next 512 bytes, the block ID is incremented by "1" (+1). The BCC is standardized also in American National Standards Institute (ANSI) such that check code including CRC code of two bytes and a block ID of six bytes (check code including Meta Tag of two bytes and Reference Tag of four bytes) is known as T10 code.

Such a conventional disk array apparatus is described below with reference to FIG. 14. FIG. 14 is a block diagram of the structure of a disk array system using a conventional disk array apparatus. As shown in FIG. 14, a disk array apparatus 100 is connected to two host computers, that is, a host computer A 102A and a host computer B 102B, via fiber-channel links 104A and 104B, respectively. The disk array apparatus 100 includes a host adaptor A 106A and a host adaptor B 106B each in charge of a host I/F; a cache memory A 108A and a cache memory B 108B; a cache controller A 110A and a cache controller B 110B each managing a cache; a disk adaptor A 112A and a disk adaptor B 112B each in charge of a disk I/F; a switch A 114A and a switch B 114B each providing a connection to a plurality of disks; and a plurality of disk drives A 116A disk drives B 116B.

The cache controller A 110A provides a data transfer route between the host adaptor A 106A and the disk adaptor A 112A, while the cache controller B 110B provides a data transfer route between the host adaptor B 106B and the disk adaptor B 112B. Also between the cache controller A 110A and the cache controller B 110B, a data transfer route (cache-to-cache link) 118 is provided for use in data mirroring between the cache memory A 108A and the cache memory B 108B. The cache memory A 108A and the cache memory B 108B are each implemented by a volatile memory, such as a dynamic random access memory (DRAM). Therefore, a copy of data stored in one cache memory is always stored in the other cache memory, thereby providing a control so as to prevent the data from being lost when a failure occurs. This is called cache mirroring.

FIG. 14 is a block diagram of a conventional disk array system. Here, the case of storing data transmitted from the host computer A 102A in the disk array apparatus is described. The data to be stored in the disk drives A 116A is first transmitted from the host computer A 102A to the host adaptor A 106A. The host adaptor A 106A adds a BCC to the received data, and then transfers the data to the cache controller A 110A.

The cache controller A 110A temporarily stores the received data with the BCC in the cache memory A 108A, and also transfers the received data with the BCC to the cache controller B 110B for storage in the cache memory B 108B, thereby performing a mirroring process. With this, in the cache memory B 108B, the same data as the data stored in the cache memory A 108A is stored. Then, upon completion of mirroring, the cache controller A 110A notifies the host adaptor A 106A that the mirroring process has ended. The host adaptor A 106A then notifies the host computer A that data storing has ended normally.

Furthermore, the data stored in the cache memory A 108A is stored at a predetermined timing in the disk drives A 116A and the disk drives B 116B. At this time, the disk adaptor A 112A checks the BCC added to the data, thereby checking data validity, determining, for example, whether data has been corrupted.

Still further, another technology has been suggested, in which, upon mirroring the data, further mirroring is performed to ensure reliability of the data at the mirroring destination by transmitting a copy of the data not only to the mirroring destination but also to another controlling unit, in which data is checked (see, for example, Japanese Patent Laid-Open Publication No. 2001-175582).

In the conventional technologies described above, mirroring of cache memories is performed to improve reliability. However, if erroneous data, such as data corrupted due to a hardware failure, is written in the cache memory of the mirroring source or if data has been written in an erroneous address of the cache memory, the data stored through mirroring in the cache memory of the mirroring destination loses its reliability accordingly. Therefore, without correct data being stored in the disk array apparatus, the host computer is erroneously notified that the data has been normally stored, thereby causing a problem in data reliability. Moreover, also in the technology disclosed in the Japanese patent publication described above, since data checking is performed after mirroring itself is performed, a process of deleting the mirrored data, a process of re-mirroring, and the like are required even if a failure is found in the data, thereby making the entire process complex.

SUMMARY OF THE INVENTION

It is an object of the present invention to solve at least the above problems in the conventional technology.

A storage control apparatus according to one aspect of the present invention includes a plurality of temporary storage units that are managed in a redundant manner by data mirroring, and temporarily store data input from an outside source; a temporary-storage control unit that controls input and output of the data to the temporary storage units; and a mirroring control unit that controls the data mirroring between the temporary storage units, checks, when performing the data mirroring, validity of the data stored in a temporary storage unit of a mirroring source, and executes, when the validity of the data has been confirmed, the data mirroring.

An external storage apparatus according to another aspect of the present invention includes a plurality of temporary storage units that are managed in a redundant manner by data mirroring, and temporarily store data input from an outside source; a temporary-storage control unit that controls input and output of the data to the temporary storage units; a mirroring control unit that controls the data mirroring between the temporary storage units, checks, when performing the data mirroring, validity of the data stored in a temporary storage unit of a mirroring source, and executes, when the validity of the data has been confirmed, the data mirroring; a disk apparatus that includes a plurality of disks to store the data stored in the temporary storage unit; and a disk-apparatus control unit that controls input and output of the data to the disk apparatus.

The other objects, features, and advantages of the present invention are specifically set forth in or will become apparent from the following detailed description of the invention when read in conjunction with the accompanying drawings.

DETAILED DESCRIPTION

Exemplary embodiments according to the present invention are described below in detail with reference to the accompanying drawings. The present invention is not restricted to the following description, but can be modified as appropriate within a scope not departing from the gist of the present invention.

Figure 1:
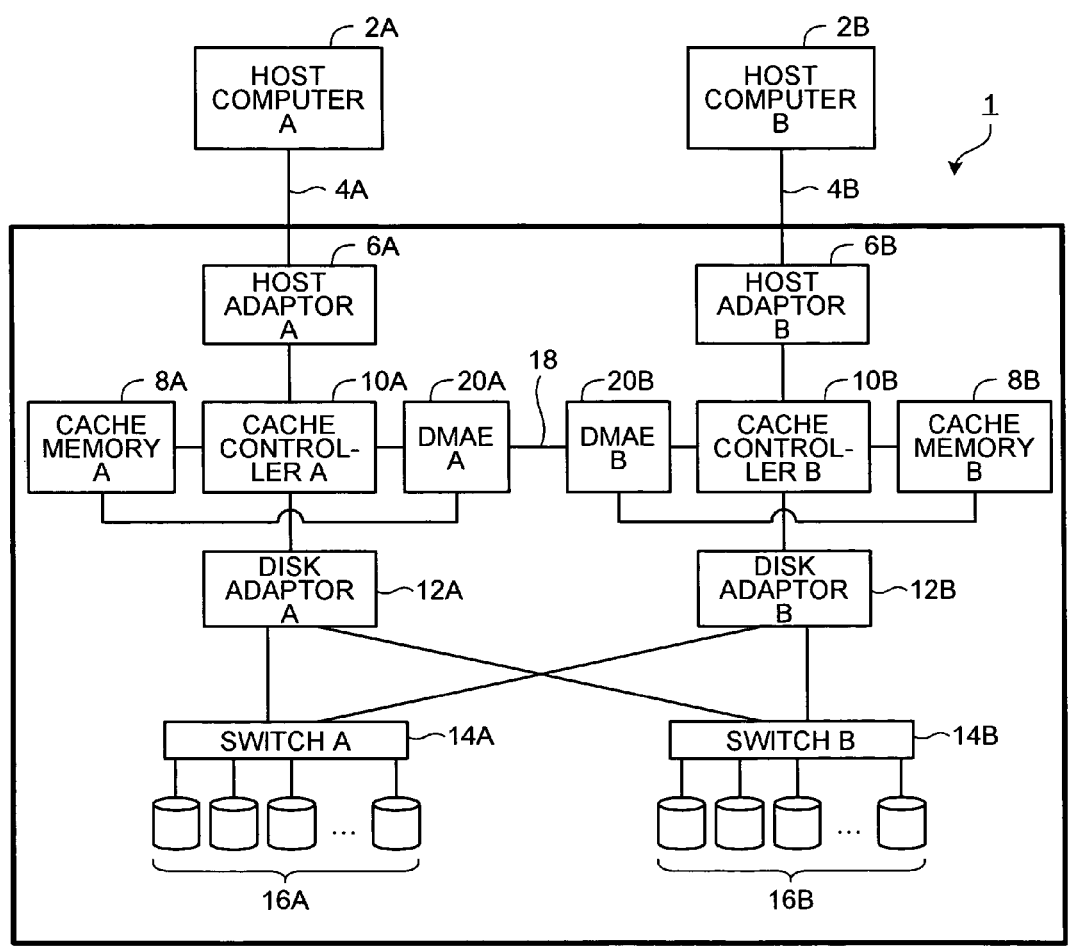
FIG. 1 is a block diagram of a disk array system according to an embodiment of the present invention.

FIG. 1 is a block diagram of a disk array system using a disk array apparatus according to an embodiment of the present invention as an external storage apparatus. In the disk array system, a disk array apparatus 1 is connected to two host computers, that is, a host computer A 2A, and a host computer B 2B, via a fiber-channel link A 4A and a fiber-channel link B 4B, respectively. Also, the disk array apparatus 1 includes a host adaptor A 6A and a host adaptor B 6B; a cache memory A 8A and a cache memory B 8B; a cache controller A 10A and a cache controller B 10B; a disk adaptor A 12A and a disk adaptor B 12B; a switch A 14A and a switch B 14B; a plurality of disk drives A 16A and a plurality of disk drives B 16B; a data transfer route (cache-to-cache link) 18; and a mirroring control DMA engine (DMAE) A 20A and a mirroring control DMA engine (DMAE) B 20B.

Note that the host computer A 2A and the host computer B 2B may be hereinafter collectively a host computer. Similarly, the host adaptor A 6A and the host adaptor B 6B may be hereinafter collectively a host adaptor; the cache memory A 8A and the cache memory B 8B may be hereinafter collectively a cache memory 8; the cache controller A 10A and the cache controller B 10B may be hereinafter collectively a cache controller 10; the disk adaptor A 12A and the disk adaptor B 12B may be hereinafter collectively a disk adaptor 12; the switch A 14A and the switch B 14B may be hereinafter collectively a switch 14; the disk drives A 16A and the disk drives B 16B may be collectively a disk drives 16; and the DMAE•A 20A and the DMAE•B 20B may be collectively a DMAE 20.

Here, the host adaptor A 6A and the host adaptor B 6B take charge of a host I/F of the host computer A 2A and a host I/F of the host computer B 2B, respectively.

The cache memory A 8A and the cache memory B 8B are temporary storage units that temporarily store data transmitted from the host computer 2, which is an external apparatus. Such cache memories A 8A and B 8B are each implemented by a volatile memory, such as a DRAM. Therefore, a copy of data stored in one cache memory is always stored, that is, mirrored, in the other cache memory. For example, a copy of the data stored in the cache memory A 8A, which is a mirroring source, is always stored in the cache memory B 8B, which is a mirroring destination.

Similarly, a copy of the data stored in the cache memory B 8B, which is a mirroring source, is always stored in the cache memory A 8A, which is a mirroring destination. With this, even when a failure occurs in one cache memory (for example, the cache memory A 8A), data loss can be prevented because the same data has been stored in the other cache memory (for example, the cache memory B 8B).

Also, in the disk array apparatus 1, when data is mirrored to the cache memory of the mirroring destination, validity of the data in the cache memory of the mirroring source is checked, that is, whether the data has been corrupted, for example, is checked. Then, as a result of checking, only in the case where validity of the data has been confirmed (it is confirmed that the data has not been corrupted, for example), the data is stored in the other cache memory. As such, in the disk array apparatus 1, erroneous data in which a failure occurred is prevented from being stored in the cache memory of the mirroring destination. Therefore, an external storage apparatus that stores data with a high degree of reliability is achieved.

For example, when the data stored in the cache memory A 8A is mirrored to the cache memory B 8B, validity of the data in the cache memory A 8A is checked, that is, whether the data has been corrupted, for example, is checked. Then, only in the case where data validity has been confirmed (it is confirmed that the data has not been corrupted, for example), the data is stored in the cache memory B 8B. Similarly, when the data stored in the cache memory B 8B is mirrored to the cache memory A 8A, validity of the data in the cache memory B 8B is checked, that is, whether the data has been corrupted, for example, is checked. Then, only in the case where data validity has been confirmed (it is confirmed that the data has not been corrupted, for example), the data is stored in the cache memory A 8A.

Also, the cache memory 8 serves not only as a cache memory of the disk array system shown in FIG. 1 but also as a system memory of the cache controller 10. That is, part of the cache memory 8 is used as a storage area and a working area of a program executed by a central processing unit (CPU) 22 in the cache controller 10, which will be described further below. Furthermore, as will be described further below, a descriptor, which serves as information indicative of an instruction to the DMAE 20, is also generated by the CPU 22 in the cache controller 10, which will be described further below, and is stored in the cache memory 8.

Figure 2:
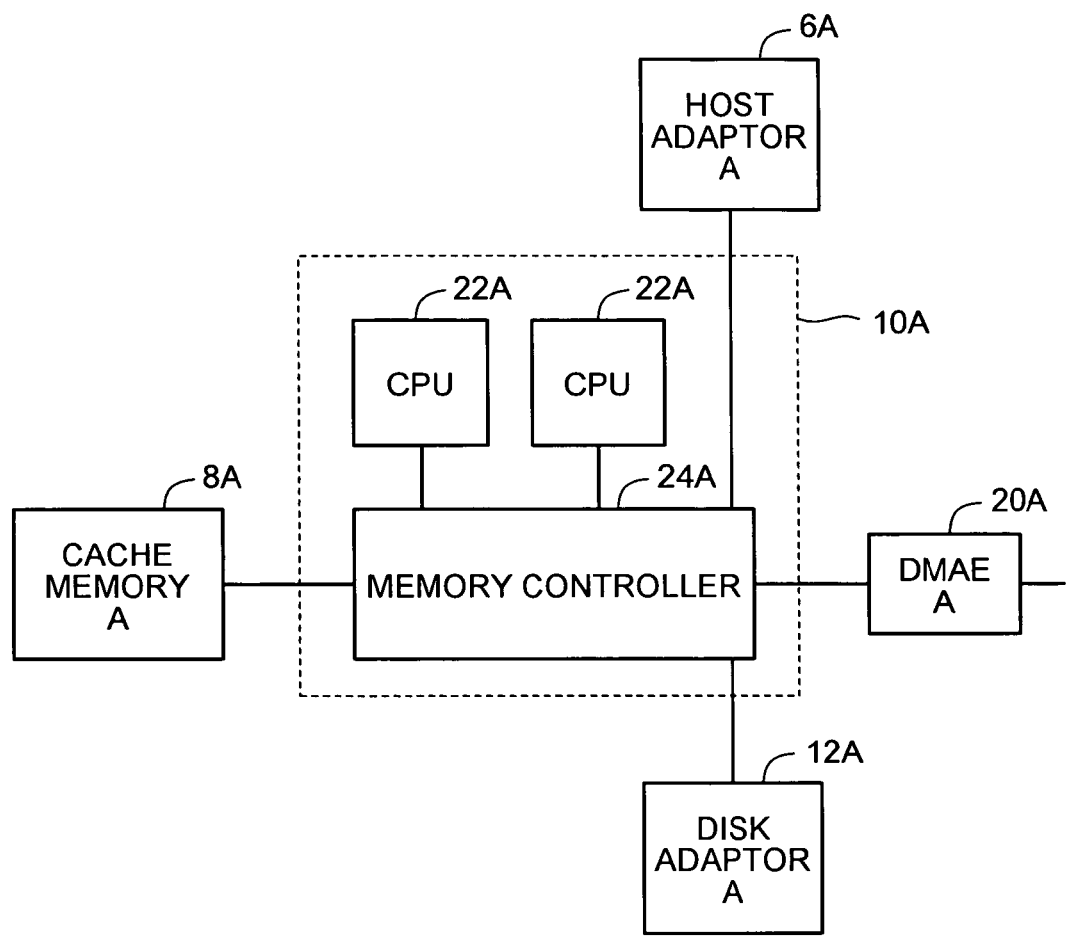
FIG. 2 is a block diagram of a cache controller and its peripheral portions.

FIG. 2 is a block diagram of the cache controller A 10A and its peripheral portion. Although FIG. 2 depicts only the structure of the cache controller A 10A, the structure of the cache controller B 10B is similar to that of the cache controller A 10A. The cache controller A 10A includes one or more CPUs 22A (two in FIG. 2), and a memory controller 24A to which the CPUs 22A is connected. The memory controller 24A has a plurality of input/output (I/O) ports not shown, and has connected thereto the host adaptor A 6A, the disk adaptor A 12A, and the DMAE•A 20A.

The cache controller A 10A and the cache controller B 10B are cache-memory controlling units that control inputs and outputs of data to the cache memory 8, which is a temporary storage unit, manage the cache memory A 8A and the cache memory B 8B, respectively, and cause data received from the host computer to be stored in the relevant cache memory. That is, the cache controller A 10A causes the data received from the host computer A 2A to be stored in the relevant cache memory A 8A. On the other hand, the cache controller B 10B causes the data received from the host computer B 2B to be stored in the relevant cache memory B 8B.

Here, when causing the data received from the host computer to be stored in the relevant cache memory, the cache controller 10 adds a CRC code calculated from the data and a block ID indicative of positional information of the data to the data, and then causes the data to be stored in the relevant cache memory. The CRC code and the block ID are collectively referred to as a BCC, acting as check code for a data block.

Also, in addition to causing the data received from the host computer 2 to be stored in the relevant cache memory, the cache controller 10 issues an instruction to the DMAE 20 to perform an auxiliary process of transferring the data received from the host computer to the other cache memory, which is not the cache-controller's own cache memory, for mirroring.

That is, after causing the data with the BCC being added thereto to be stored in the relevant cache memory, the cache controller 10 generates data-transfer instruction information (a descriptor) including the length and address of the stored data, and then causes the generated information to be stored in the cache memory 8. Then, the cache controller 10 notifies the DMAE 20 that a descriptor has been generated. With this notification as a trigger, the DMAE 20 starts mirroring.

The cache controller 10 as described above uses the cache memory as a system memory. That is, the cache controller uses part of the cache memory 8 as a storage area and a working area for the programs to be executed by the CPUs 22A. Also, the descriptor serving as data-transfer instruction information for the DMAE 20 is generated by the CPUs 22A in the cache memory 8.

Furthermore, the cache controller 10 provides a data transfer route between the host adaptor 6 and the disk adaptor 12. That is, the cache controller A 10A provides a data transfer route between the host adaptor A 6A and the disk adaptor A 12A, and the cache controller B 10B provides a data transfer route between the host adaptor B 6B and the disk adaptor B 12B.

Still further, between the cache controller A 10A and the cache controller B 10B, the data transfer route 18 (cache-to-cache link) is provided via the DMAE•A 20A and the DMAE•B 20B, and is used for mirroring of the cache memory A 8A and the cache memory B 8B.

The disk adaptor 12, which is a disk apparatus controlling unit, is in charge of a disk I/F interfacing with the disk drives 16. Also, the disk adaptor 12 checks the BCC when the data with the BCC stored in the cache memory is stored in the disk drives at a predetermined timing to see whether the data with the BCC is normal data without being corrupted, for example. The switch 14 provides a connection from the disk adaptor 12 to a plurality of disks included in the disk drives 16. The disk drives 16 each include the disks, in which the data stored in the cache memory 8 is stored at the predetermined timing.

Figure 3:
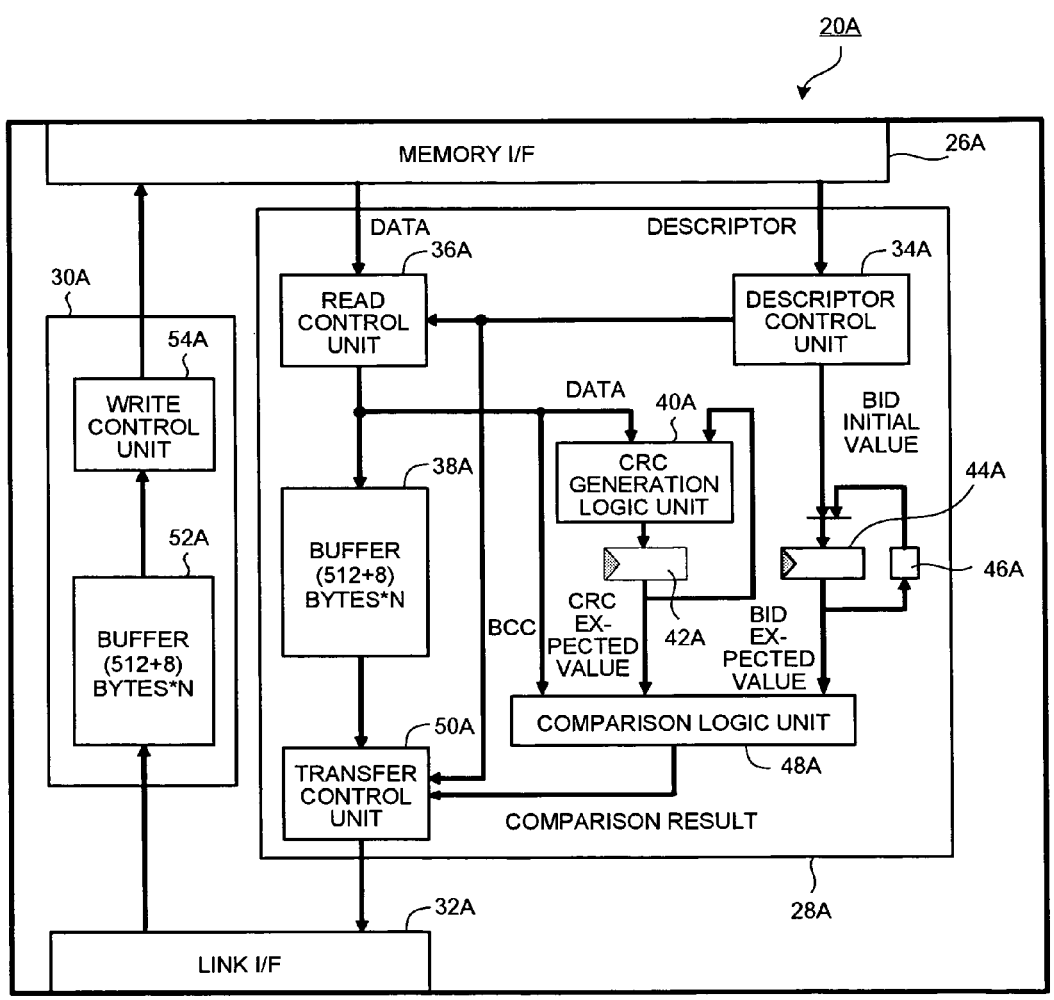
FIG. 3 is a block diagram of a DMAE.

FIG. 3 is a block diagram of the DMAE•A 20A that is a mirroring control unit. Although FIG. 3 exemplarily depicts the structure of the DMAE•A 20A, the structure and function of DMAE•B 20B are similar to those of the DMAE•A 20A. The DMAE A 20A includes a memory I/F 26A, a transmitting unit 28A, a receiving unit 30A, and a link I/F 32A. The transmitting unit 28A includes a descriptor controlling unit 34A, a read controlling unit 36A, a buffer 38A, a CRC generation logic unit 40A, a CRC register 42A, a block ID (BID) count register 44A, a BID counter 46A, a comparison logic unit 48A, and a transfer controlling unit 50A. The receiving unit 30A includes a buffer 52A and a write controlling unit 54A.

The memory I/F 26A is connected to the memory controller 24A of the cache controller A 10A to access the descriptor and the data stored in the cache memory 8A. The descriptor controlling unit 34A reads the descriptor from the cache memory 8A for analysis, and then transmits the descriptor to the read controlling unit 36A and the transfer controlling unit 50A. Also, the descriptor controlling unit 34A sets a BID initial value contained in the descriptor to the BID count register 44A.

The read controlling unit 36A controls data reading from the cache memory A 8A. That is, the read controlling unit 36A reads, from a cache address of the transfer source specified by the descriptor received from the descriptor controlling unit 34A, data of the specified number of bytes, and then causes the data to be stored in the buffer 38A. Also, when causing the data read by the read controlling unit 36A to be stored in the buffer 38A, the read controlling unit 36A simultaneously transmits the data to the CRC generation logic unit 40A.

The CRC generation logic unit 40A receives the data transmitted from the read controlling unit 36A to generate CRC for every 512 bytes from a predetermined initial value (when T10 code is used, ALL '1'), and then stores the generated CRC in the CRC register 42A. The BID count register 44A stores the block ID (BID) initial value in the descriptor set by the descriptor controlling unit 34A. Thereafter, an expected value of the BID for the next data block is stored with the BID being incremented by "1" (+1) by the BID counter every time the read controlling unit 36A reads a data block of 520 bytes.

The comparison logic unit 48A receives a BCC located in the last eight bytes of 520 bytes from the data read by the read controlling unit 36A and the expected value stored in the CRC register and the BID count register. Then, the comparison logic unit 48A performs a comparison to see whether the BCC located in the last eight bytes of 520 bytes coincides with the expected value stored in the CRC register and the BID count register, and then transmits the comparison result to the transfer controlling unit 50A.

The transfer controlling unit 50A checks the comparison result to control the eventual data transfer to the cache memory of the mirroring destination (here, the cache memory B 8B). That is, the transfer controlling unit 50A transfers the data of the specified number of bytes from the buffer to a transfer-destination cache address specified by the descriptor received from the descriptor controlling unit 34A. Specifically, the transfer controlling unit 50A receives the BCC comparison result from the comparison logic unit 48A for every 520-byte data block, transfers the data block when the comparison result indicates matching, and does not transfer the data block and the remaining data when the comparison result indicates mismatching.

When the comparison result indicates matching, this indicates that the data received by the cache controller A 10A coincides with the data stored in the cache memory A 8A, which means that the data stored in the cache memory A 8A is normal data without being corrupted, for example. When the comparison result indicates matching, it can be ensured that the data stored in the cache memory A 8A is normal data. Therefore, when the comparison result indicates matching, the transfer controlling unit 50A causes the data block stored in the buffer 38A to be transferred to the cache memory B 8B, which is a cache memory of the mirroring destination, thereby making it possible to perform mirroring with data validity being ensured. Thus, the same and normal data is stored in the cache memory A 8A and the cache memory B 8B.

On the other hand, when the comparison result indicates mismatching (when mismatching is found in the comparison result), this means that the data received by the cache controller A 10A does not coincide with the data stored in the cache memory A 8A, which means that the data stored in the cache memory A 8A has been corrupted, for example. With the comparison mentioned above, it is possible to detect corrupted data before mirroring is started, that is, before the data is stored in the cache memory B 8B.

When the comparison result indicates mismatching, it cannot be ensured the data stored in the cache memory A 8A is normal data. Therefore, when the comparison result indicates mismatching, the transfer controlling unit 50A does not cause the data block stored in the buffer 38A to be transferred to the cache memory B 8B, which is a cache memory of the mirroring destination. With this, abnormal data, such as corrupted data, can be prevented from being stored (mirrored) in the cache memory B 8B, which is a cache memory of the mirroring cache memory. Thus, a process of deleting mirrored data, a process of re-mirroring, and the like can be prevented, thereby making it possible to easily and reliably perform mirroring only normal data.

The buffer 52A temporarily stores the data transferred, the data having had its validity confirmed by the DMAE•B 20B. Then, the data stored in the buffer 52A is stored in the cache memory A 8A under the control of the write controlling unit 54A.

FIGS. 4 to 13 are flowcharts of the procedure of the disk array system according to the present embodiment. Here, the case where the data transmitted from the host computer A 2A is stored in the cache memory A 8A and the disk drives A 16A, and is also mirrored to the cache memory B 8B is exemplarily described.

Figure 4:
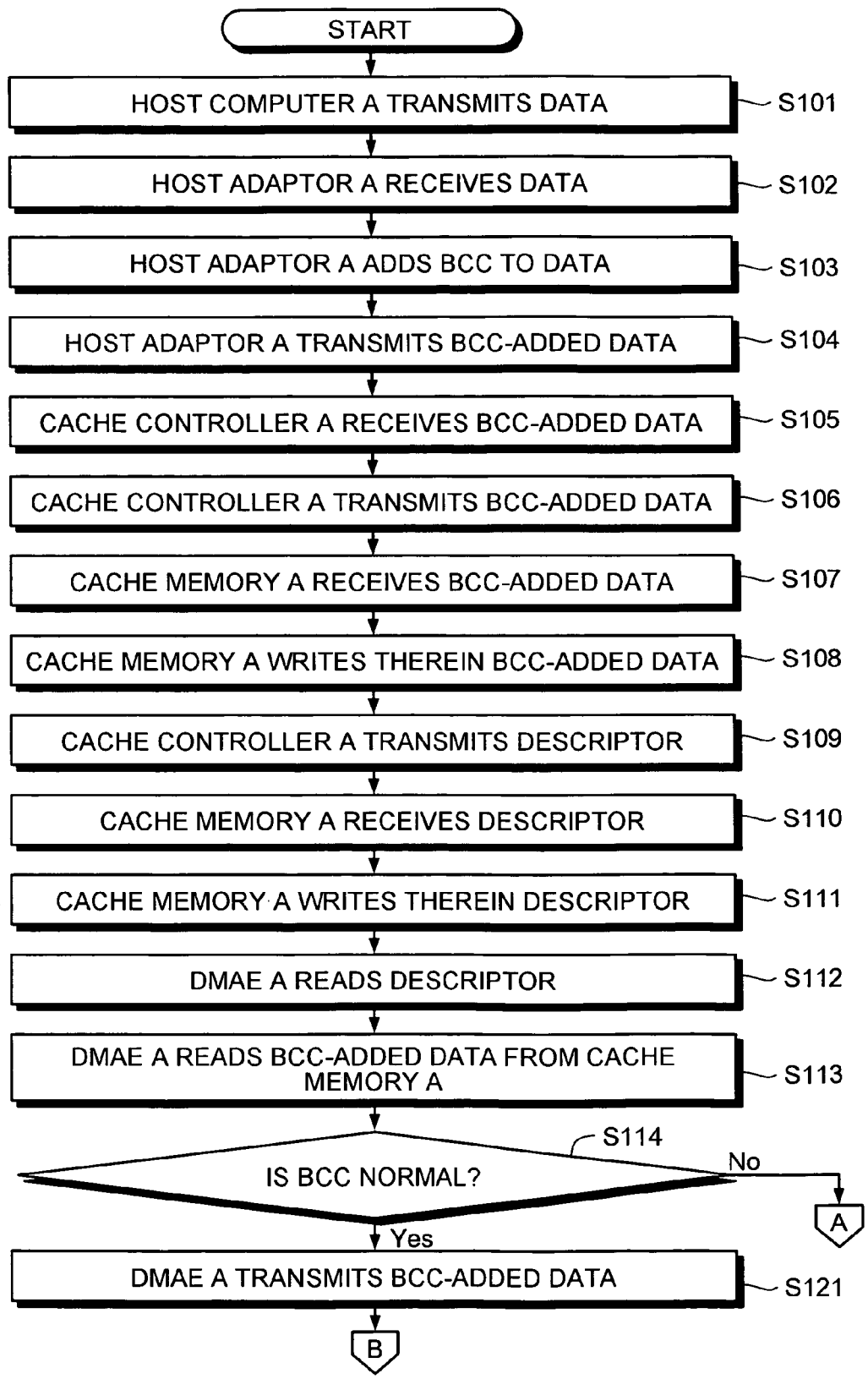
FIG. 4 is a flowchart (1) of a process of a disk array system.
Figure 5:
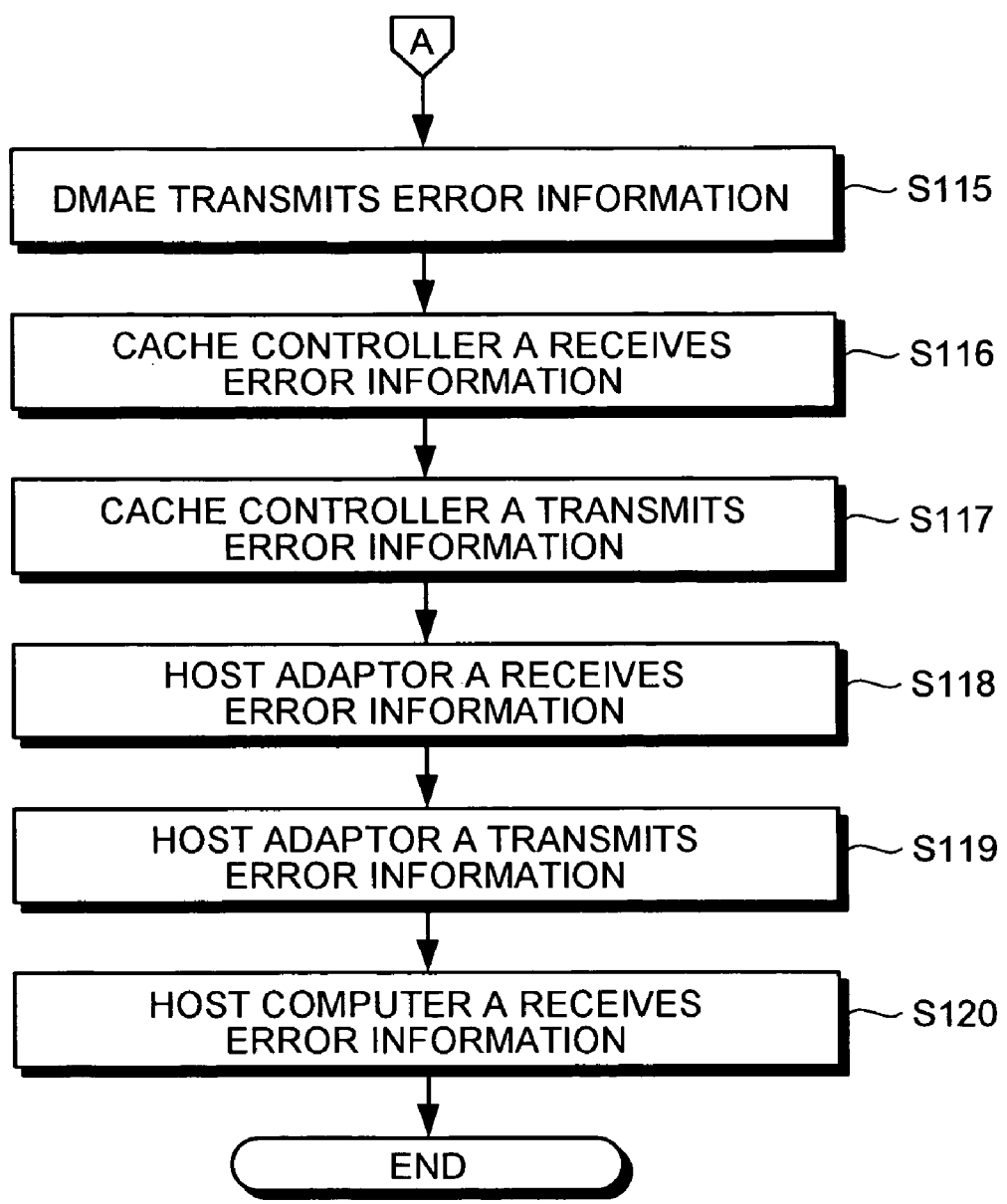
FIG. 5 is a flowchart (2) of a process of a disk array system.
Figure 6:
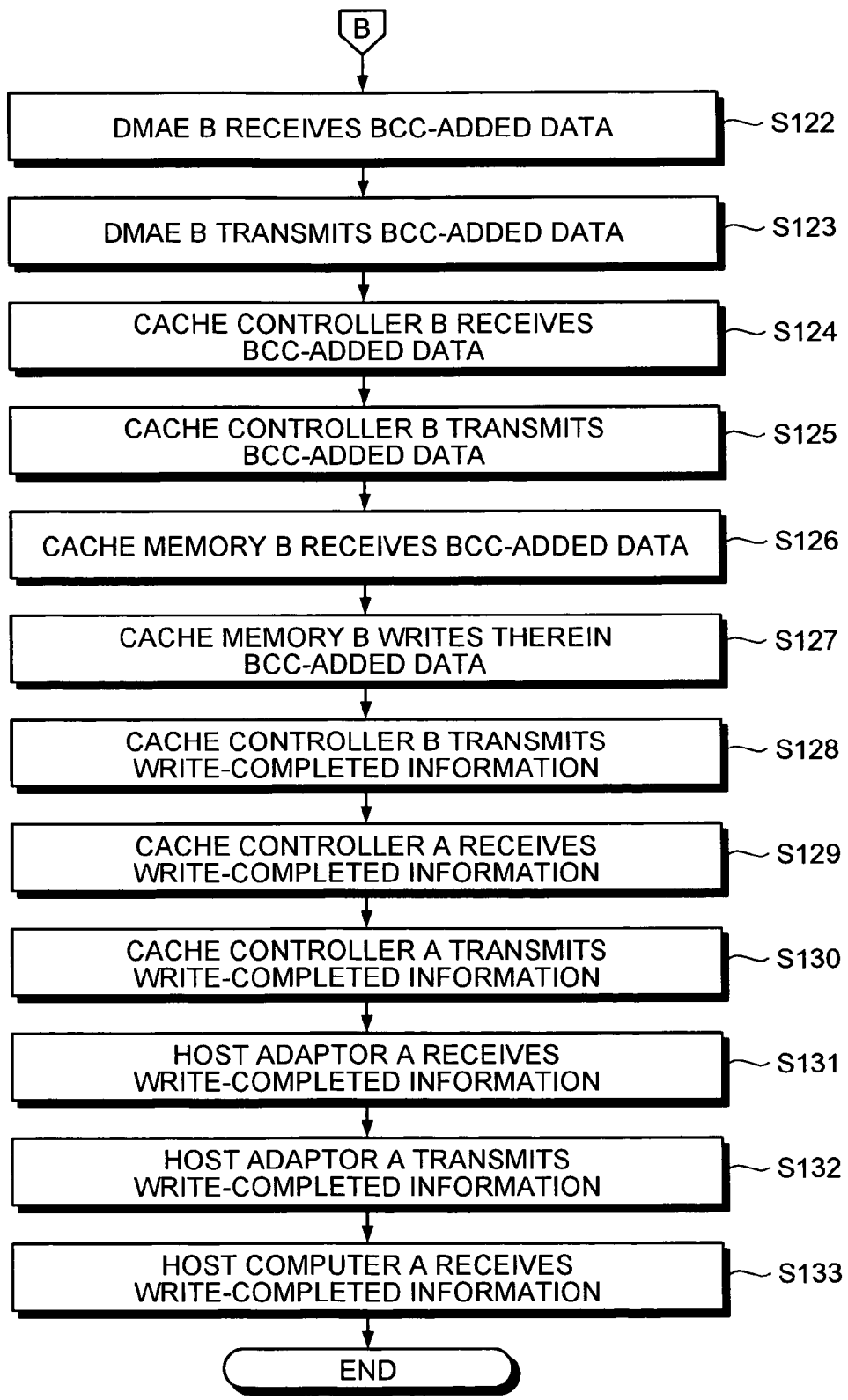
FIG. 6 is a flowchart (3) of a process of a disk array system.

First, the process of storing the data transmitted from the host computer A 2A in the cache memory A 8A and the disk drives A 16A is described by using the flowcharts of FIGS. 4 to 6. First, the host computer A 2A transmits data to the host adaptor A 6A (step S101). The host adaptor A 6A receives the data transmitted by the host computer A 2A (step S102), and then adds a BCC of eight bytes to the data for every 512 bytes (step S103). Then, the host adaptor A 6A transmits the data having the BCC added thereto (hereinafter, BCC-added data) to the cache controller A 10A (step S104).

The cache controller A 10A receives the BCC-added data transmitted from the host adaptor A 6A (step S105), and then transmits the BCC-added data to the cache memory A 8A (step S106). The cache memory A 8A receives the BCC-added data transmitted from the cache controller A 10A (step S107), and then stores, that is, writes, the data therein (step S108).

Next, the cache controller A 10A generates data-transfer instruction information (a descriptor) describing the length and address of the data, and then transmits the descriptor to the cache memory A 8A (step S109). The cache memory A 8A receives the descriptor (step S110), and then writes (stores) the descriptor in a working area of the cache memory A 8A (step S111). Also, after the cache memory A 8A writes the descriptor, the cache controller A 10A transmits instruction information to the DMAE•A 20A instructing the DMAE•A 20A to read the descriptor in the cache memory A 8A.

Upon receiving this instruction information, the DMAE•A 20A reads the descriptor from the cache memory A 8A (step S112) and, based on the information in the descriptor, reads the BCC-added data from the cache memory A 8A (step S113). Next, the DMAE•A 20A checks the BCC of the read BCC-added data to see whether the BCC-added data read from the cache memory A 8A has been corrupted, for example, that is, whether the data is normal data (step S114). This BCC check will be described further below in detail.

When the BCC-added data read from the cache memory A 8A is not normal data (corrupted data, for example, No at step S114), as shown in the flowchart of FIG. 5, the DMAE•A 20A transmits error information to the cache controller A 10A (step S115). The cache controller A 10A receives the error information transmitted from the DMAE•A 20A (step S116), and then transmits the error information to the host adaptor A 6A (step S117).

The host adaptor A 6A receives the error information transmitted from the cache controller A 10A (step S118), and then transmits the error information to the host computer A 2A (step S119). Then, with the host computer A 2A receiving the error information (step S120), a series of processes performed on the data transmitted at step S101 by the host computer A 2A ends.

On the other hand, consider the case where, as a result of checking at step S114 to see whether the BCC-added data read from the cache memory A 8A has been corrupted, for example, that is, whether the BCC-added data is normal data, it is confirmed that the BCC-added data is normal data (such as data that has not been corrupted, for example, Yes at step S114). In this case, the DMAE A 20A transmits the BCC-added data to the DMAE•B 20B (step S121). As shown in the flowchart of FIG. 6, upon receiving the BCC-added data transmitted from the DMAE•A 20A (step S122), the DMAE•B 20B transmits the BCC-added data to the cache controller B 10B (step S123).

The cache controller B 10B receives the BCC-added data transmitted from the DMAE•B 20B (step S124), and then transmits the BCC-added data to the cache memory B 8B (step S125). The cache memory B 8B receives the BCC-added data transmitted from the cache controller B 10B (step S126), and then writes (stores) the BCC-added data therein (step S127). Then, upon completion of writing (storing) of the BCC-added data in the cache memory B 8B, the cache controller B 10B transmits information indicative of the completion of writing (storing) of the BCC-added data (hereinafter, data-storing-completed information) to the cache controller A 10A via the DMAE•B 20B and the DMAE A 20A (step S128).

Upon receiving the data-storing-completed information from the cache controller B 10B (step S129), the cache controller A 10A transmits the information to the host adaptor A 6A (step S130). Upon receiving the data-storing-completed information from the cache controller A 10A (step S131), the host adaptor A 6A transmits the information to the host computer A 2A (step S132). Then, with the host computer A 2A receiving the data-storing-completed information (step S133), the data transmitted at step S101 from the host computer A 2A is stored in the cache memory A 8A and the cache memory B 8B in a normal state, thereby causing the process of storing the data in the cache memory A 8A and the cache memory B 8B to end.

Figure 7:
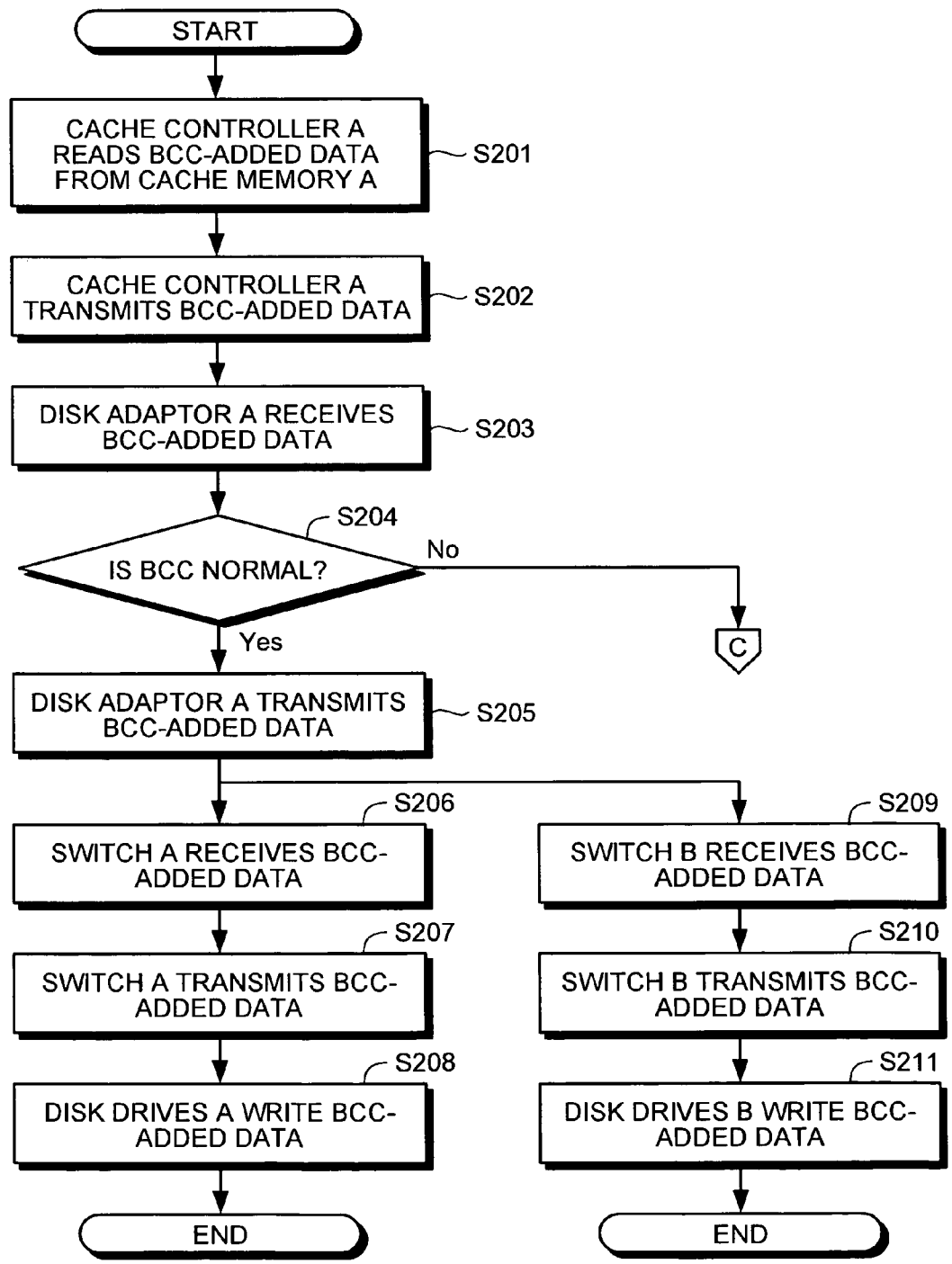
FIG. 7 is a flowchart (4) of a process of a disk array system.

Next, a process of storing the BCC-added data stored in the cache memory A 8A or the cache memory B 8B in the disk drives A 16A and the disk drives B 16B is described by using flowcharts shown in FIGS. 7 to 10. First, as shown in the flowchart of FIG. 7, the cache controller A 10A reads the BCC-added data from the cache memory A 8A (step S201), and then transmits the BCC-added data to the disk adaptor A 12A (step S202). The disk adaptor A 12A receives the BCC-added data transmitted from the cache controller A 10A (step S203), and then checks the BCC of the BCC-added data to see whether the BCC-added data has been corrupted, for example, that is, whether the data is normal data (step S204).

When the BCC-added data transmitted from the cache controller A 10A is normal data (when the data has not been corrupted, for example, Yes at step S204), the disk adaptor A 12A transmits the BCC-added data to the switch A 14A and the switch B 14B (step S205). Upon receiving the BCC-added data (step S206), the switch A 14A transmits the BCC-added data to the disk drives A 16A (step S207). Then, the disk drives A 16A receives the BCC-added data transmitted from the switch A 14A, and then writes the received BCC-added data to the disks in the disk drives A 16A (step S208). With this, a series of processes of storing, in the disk drives A 16A, the BCC-added data stored in the cache memory A 8A ends.

Upon receiving the BCC-added data (step S209), the switch B 14B transmits the BCC-added data to the disk drives B 16B (step S210). Then, the disk drives B 16B receives the BCC-added data transmitted from the switch B 14B, and then writes the received BCC-added data to the disks in the disk drives B 16B (step S211). With this, a series of processes of storing, in the disk drives B 16B, the BCC-added data stored in the cache memory A 8A ends.

Figure 8:
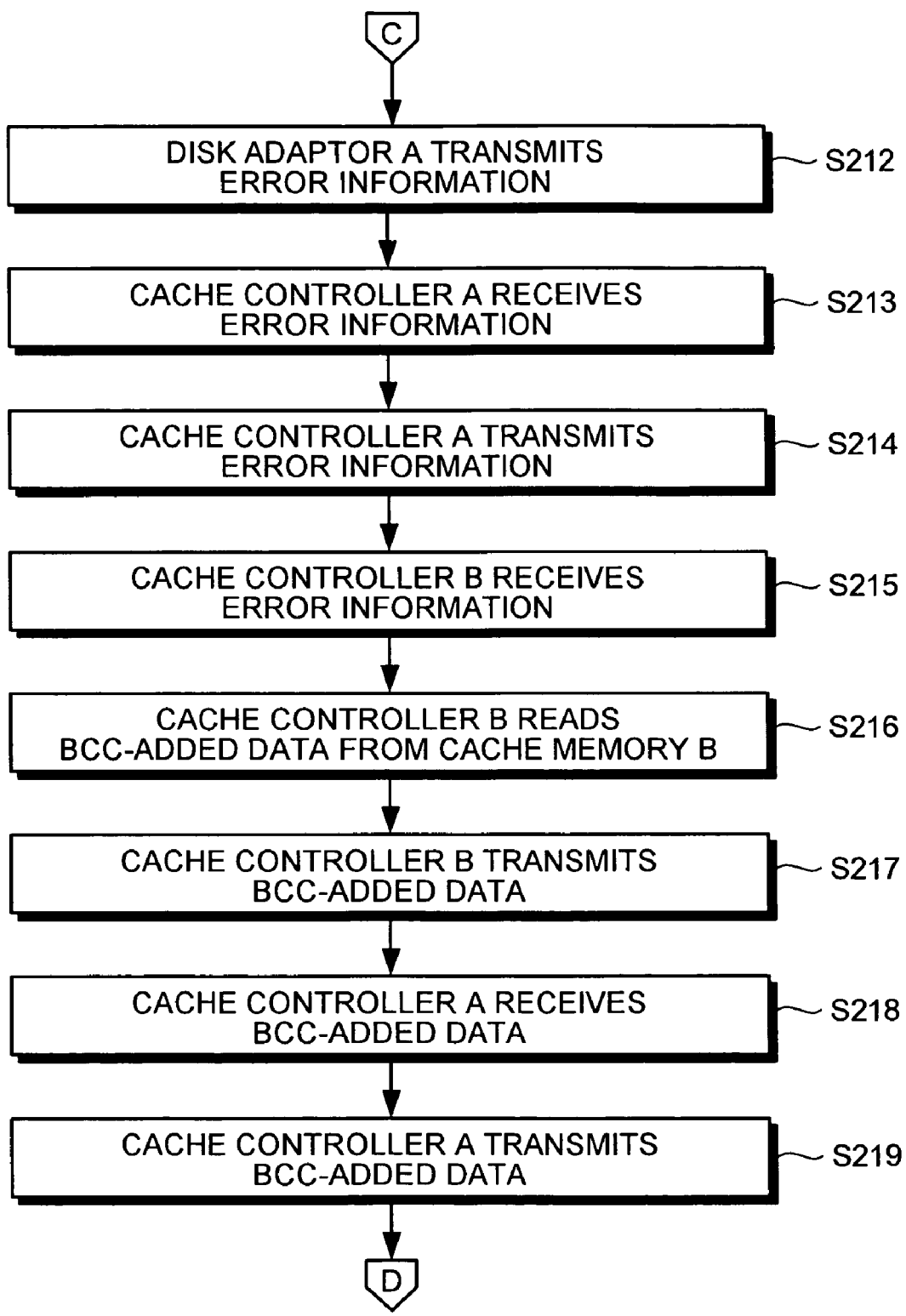
FIG. 8 is a flowchart (5) of a process of a disk array system.

On the other hand, consider the case where, as a result of checking at step S204 to see whether the BCC-added data transmitted from the cache controller A 10A has been corrupted, for example, that is, whether the BCC-added data is normal data, it is confirmed that the BCC-added data is abnormal data (such as data that is corrupted, for example, No at step S204). In this case, the procedure goes to a process of storing, in the disk drives A 16A and the disk drives B 16B, the BCC-added data stored in the cache memory B 8B, which is a mirroring cache memory. In this case, as shown in the flowchart of FIG. 8, the disk adaptor A 12A transmits error information to the cache controller A 10A (step S212). Upon receiving the error information from the disk adaptor A 12A (step S213), the cache controller A 10A transmits the error information to the cache controller B 10B via the DMAE•A 20A and the DMAE•B 20B (step S214).

Upon receiving the error information transmitted from the cache controller A 10A (step S215), the cache controller B 10B reads the BCC-added data stored in the cache memory B 8B (step S216). Then, the cache controller B 10B transmits the read BCC-added data to the cache controller A 10A via the DMAE•B 20B and the DMAE•A 20A (step S217).

Figure 9:
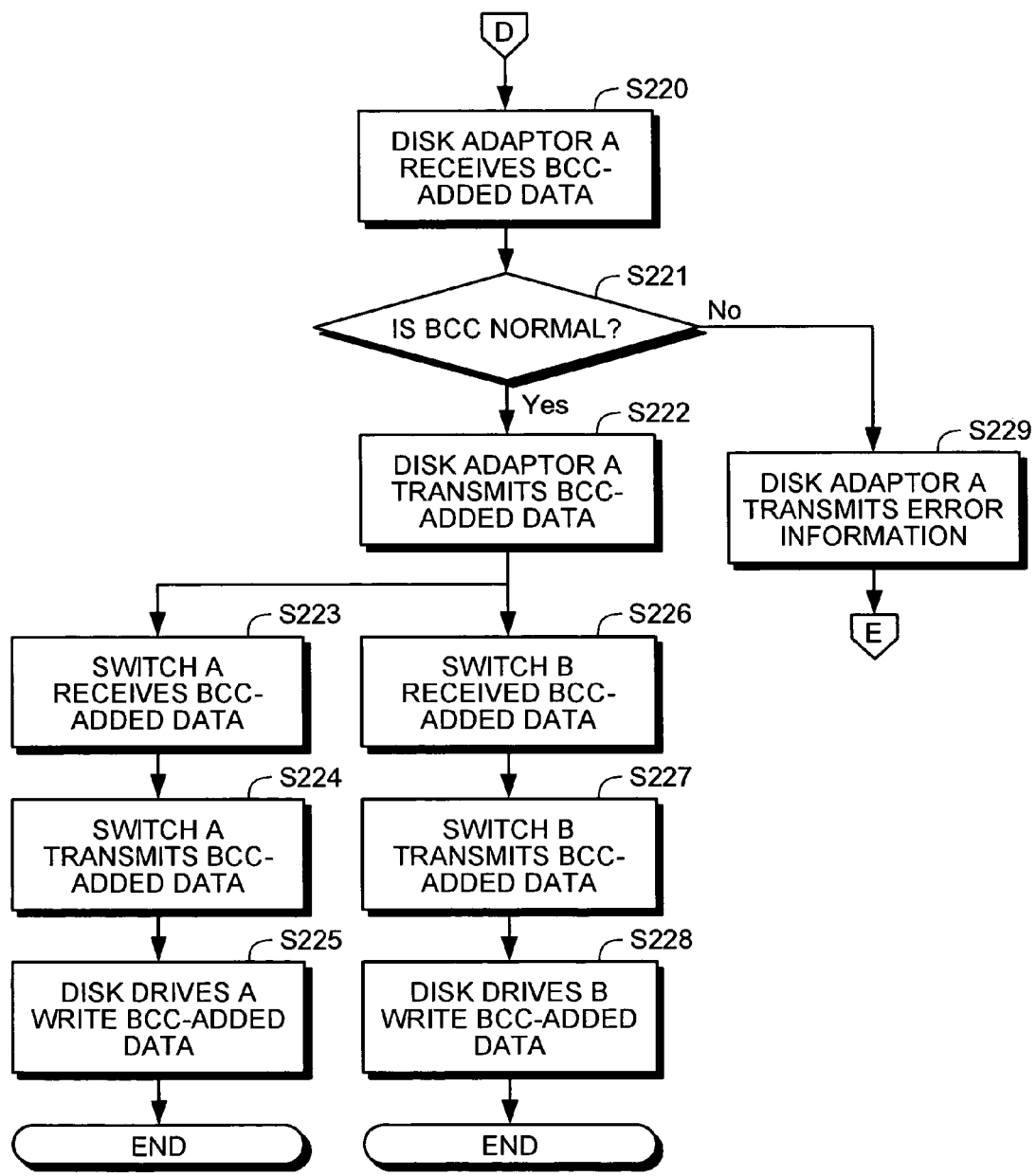
FIG. 9 is a flowchart (6) of a process of a disk array system.

The cache controller A 10A receives the BCC-added data transmitted from the cache controller B 10B (step S218), and then transmits the BCC-added data to the disk adaptor A 12A (step S219). Then, as shown in the flowchart of FIG. 9, upon receiving the BCC-added data transmitted from the cache controller A 10A (step S220), the disk adaptor A 12A checks the BCC of the BCC-added data to see whether the BCC-added data has been corrupted, for example, that is, whether the BCC-added data is normal data (step S221).

If the BCC-added data transmitted from the cache controller A 10A is normal data (if the BCC-added data has not been corrupted, for example, Yes at step S221), the disk adaptor A 12A transmits the BCC-added data to the switch A 14A and the switch B 14B (step S222). Upon receiving the BCC-added data (step S223), the switch A 14A transmits the BCC-added data to the disk drives A 16A (step S224). Then, the disk drives A 16A receive the BCC-added data transmitted from the switch A 14A, and then write the received BCC-added data to the disks in the disk drives A 16A (step S225). With this, a series of processes of storing, in the disk drives A 16A, the BCC-data stored in the cache memory B 8B ends.

Also, upon receiving the BCC-added data (step S226), the switch B 14B transmits the BCC-added data to the disk drives B 16B (step S227). Then, the disk drives B 16B receive the BCC-added data transmitted from the switch B 14B, and then write the received BCC-added data to the disks in the disk drives B 16B (step S228). With this, a series of processes of storing, in the disk drives B 16B, the BCC-data stored in the cache memory B 8B ends.

Figure 10:
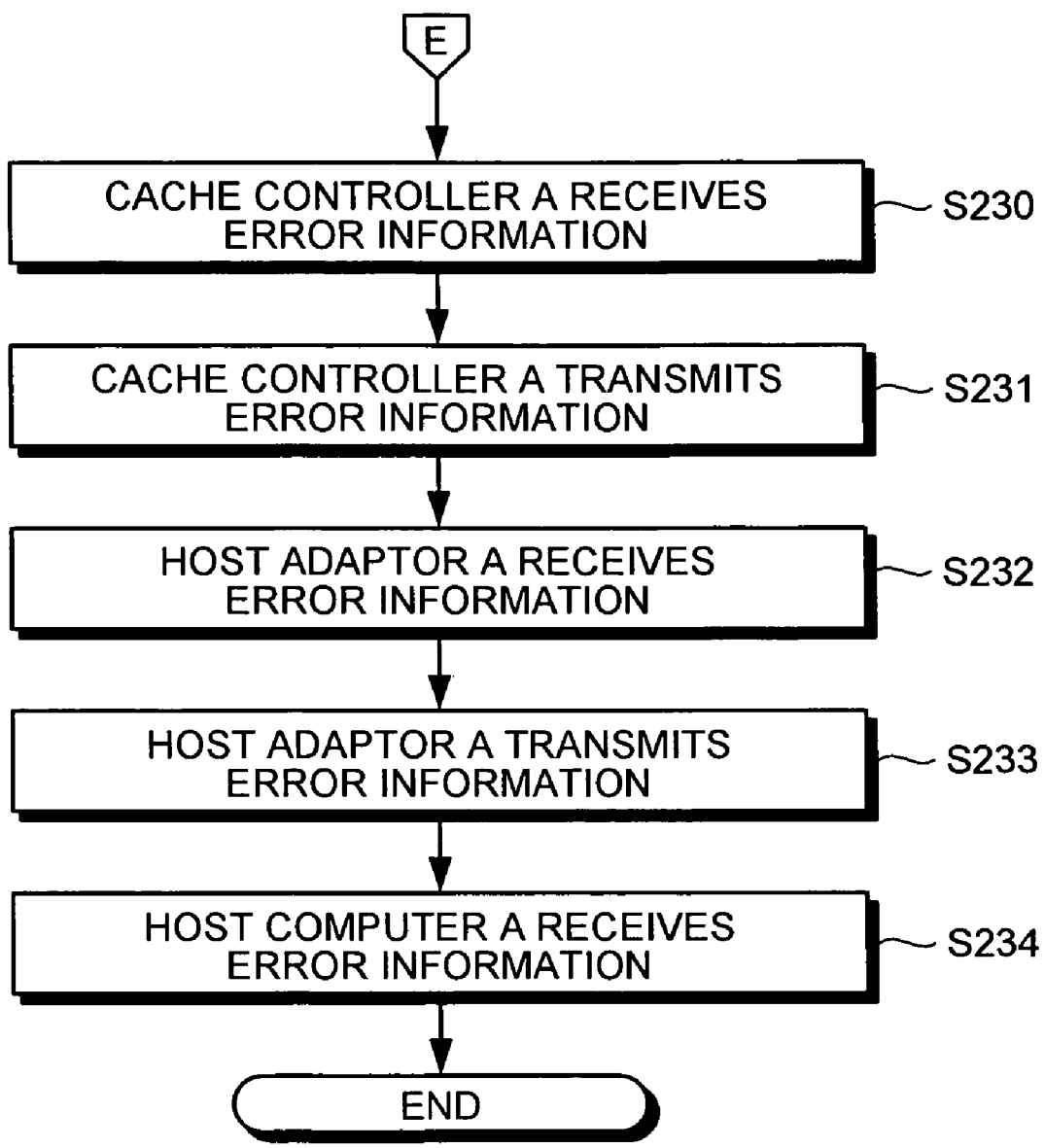
FIG. 10 is a flowchart (7) of a process of a disk array system.

On the other hand, consider the case where, as a result of checking at step S221 to see whether the BCC-added data transmitted from the cache controller A 10A has been corrupted, for example, that is, whether the BCC-added data is normal data, it is confirmed that the BCC-added data is abnormal data (such as data that is corrupted, for example, No at step S221). In this case, the disk adaptor A 12A transmits error information to the cache controller A 10A (step S229). As shown in the flowchart of FIG. 10, the cache controller A 10A receives the error information transmitted from the disk adaptor A 12A (step S230), and then transmits the error information to the host adaptor A 6A (step S231).

The host adaptor A 6A receives the error information transmitted from the cache controller A 10A (step S232), and then transmits the error information to the host computer A 2A (step S233). Then, with the host computer A 2A receiving the error information (step S234), a series of processes ends.

Figure 11:
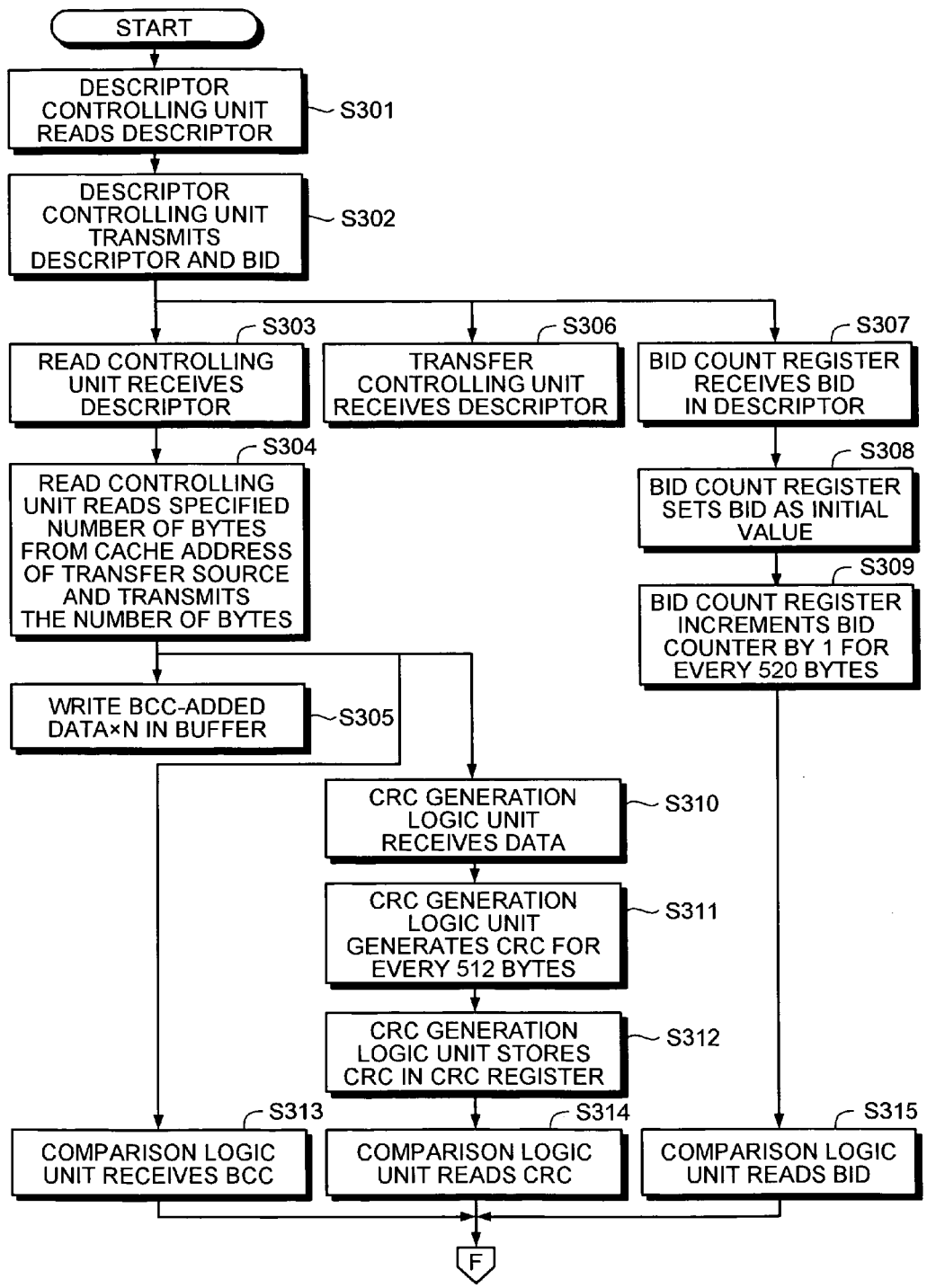
FIG. 11 is a flowchart (8) of a process of a disk array system.
Figure 12:
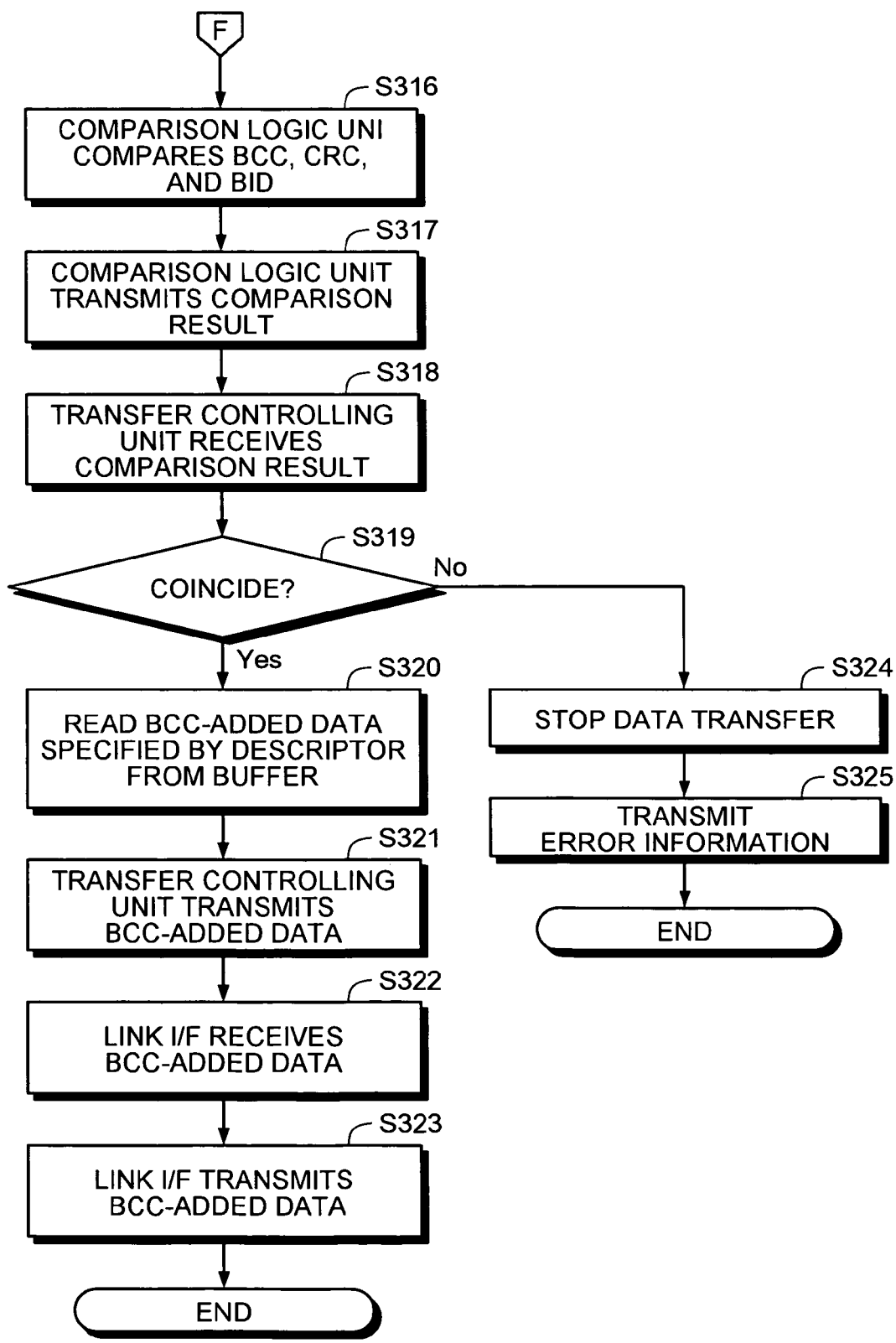
FIG. 12 is a flowchart (9) of a process of a disk array system.

Next, a process of transferring data from the DMAE•A 20A to the DMAE•B 20B is described by using FIGS. 11 and 12. Although the process is described by taking the process of the DMAE•A 20A as an example, it should be understood that the process of the DMAE•B 20B is similar to that of the DMAE•A 20A. First, as shown in FIG. 11, the descriptor controlling unit 34A reads the descriptor stored in the cache memory A 8A (step S301). Then, the descriptor controlling unit 34A transmits the descriptor to the read controlling unit 36A and the transfer controlling unit 50A, and also transmits a block ID (BID) in the read descriptor to the BID count register 44A (step S302).

The read controlling unit 36A receives the descriptor transmitted from the descriptor controlling unit 34A (step S303), reads the BCC-added data of the specified number of bytes from the transfer-source cache address included in the descriptor, and then transmits the BCC-added data to the buffer 38A. Also, of the read BCC-added data, only a data portion is transmitted to the CRC generation logic unit 40A and only the BCC is transmitted to the comparison logic unit (step S304). The buffer 38A then writes therein the BCC-data transmitted from the read controlling unit 36A (step S305).

The transfer controlling unit 50A receives the descriptor transmitted from the descriptor controlling unit 34A (step S306), and then stores the descriptor until a transfer process is performed. The BID count register 44A receives BID in the descriptor transmitted from the descriptor controlling unit 34A (step S307), and then sets an initial value to a BID initial value (step S308). Then, an expected value of the BID for the next data block is stored in the BID count register 44A with the BID being incremented by "1" (+1) by the BID count register 44A every time the read controlling unit 36A reads a data block of 520 bytes (step S309).

Next, the CRC generation logic unit 40A receives the data portion (512 bytes) of the BCC-added data transmitted at step S304 from the read controlling unit 36A (step S310), generates CRC calculated from the data for every 512 bytes (step S311), and then stores the CRC in the CRC register 42A (step S312). Then, the comparison logic unit 48A receives the BCC portion of the BCC-added data transmitted at step S304 from the read controlling unit 36A (step S313), reads the CRC generated by the CRC generation logic unit 40A from the CRC generation logic unit 40A (step S314), and then reads the BID from the BID count register 44A (step S315). Then, as shown in FIG. 12, the comparison logic unit 48A compares the BCC transmitted from the read controlling unit 36A and the CRC read from the CRC generation logic unit 40A and the BID read from the BID count register 44A (step S316), and then transmits the comparison result to the transfer controlling unit 50A (step S317).

The transfer controlling unit 50A receives the comparison result (step S318) to determine whether the BCC transmitted from the read controlling unit 36A coincides with the CRC read from the CRC generation logic unit 40A and the BID read from the BID count register 44A (step S319). Here, when the comparison result indicates matching (Yes at step S319), the transfer controlling unit 50A reads, from the buffer 38A, the BCC-added data specified by the stored descriptor (step S320), and then transmits the BCC-added data to the link I/F 32A (step S321).

The link I/F 32A receives the BCC-added data transmitted from the transfer controlling unit 50A (step S322), and then transmits the BCC-added data to the DMAE•B 20B (step S323). With this, a series of processes of transfer from the DMAE•A 20A to the DMAE•B 20B ends.

On the other hand, when the comparison result indicates mismatching at step S319 (No at step S319), the transfer controlling unit 50A stops performing the transferring process (step S324), and then transmits error information to the cache controller A 10A (step S325). With this, a series of process of stopping a transferring process at DMAE•A 20A ends. With the processes described above being performed, it is possible to detect corrupted data or the like when the BCC-added data stored in the cache memory A 8A is transferred to the cache memory B 8B, and prevent mirroring of the corrupted data. Therefore, since the BCC-added data that is corrupted or the like and stored in the cache memory A 8A is prevented from being transferred to the cache memory B 8B, the validity of the mirrored BCC-added data can be reliably ensured.

Figure 13:
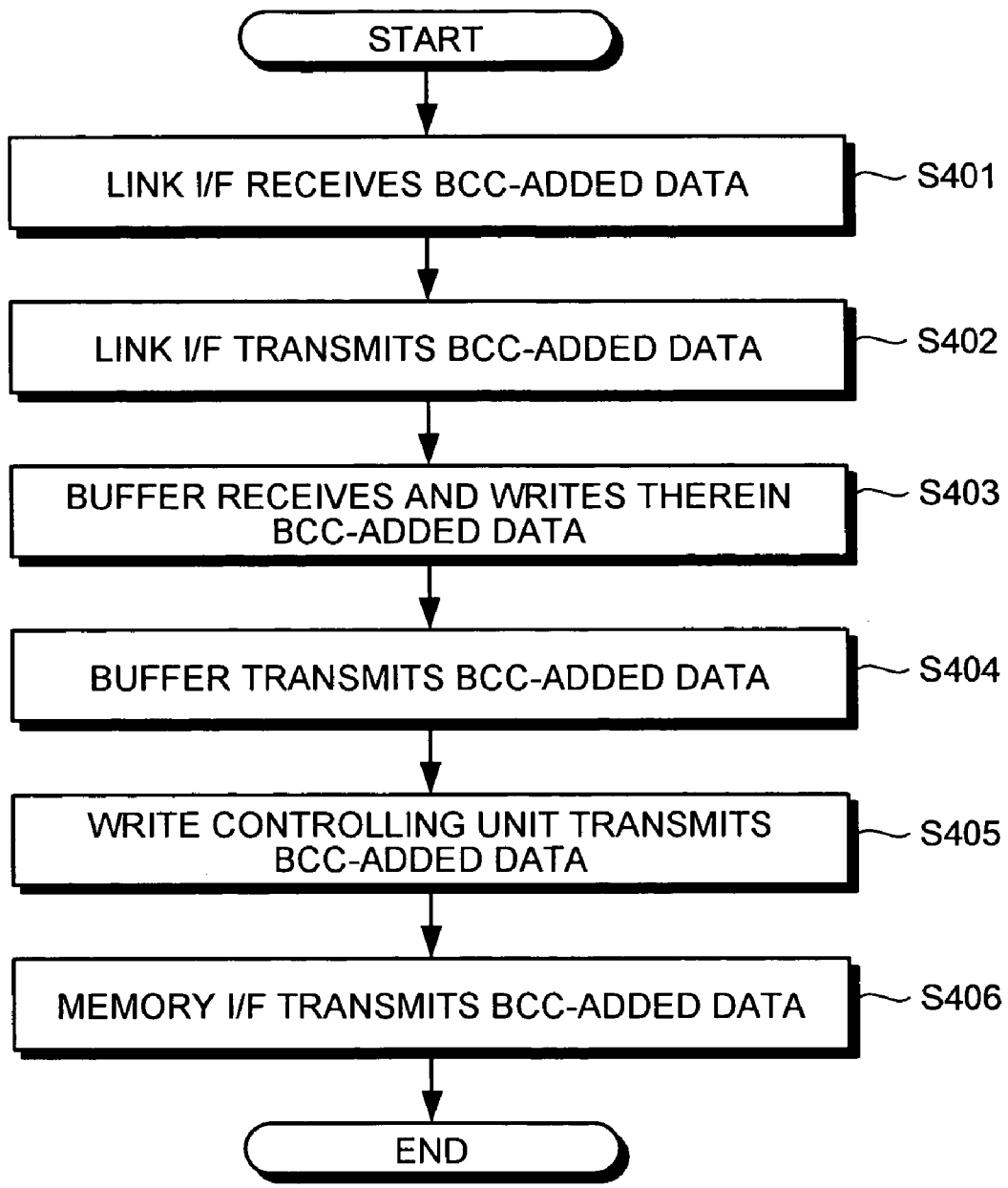
FIG. 13 is a flowchart (10) of a process of a disk array system.
Figure 14:
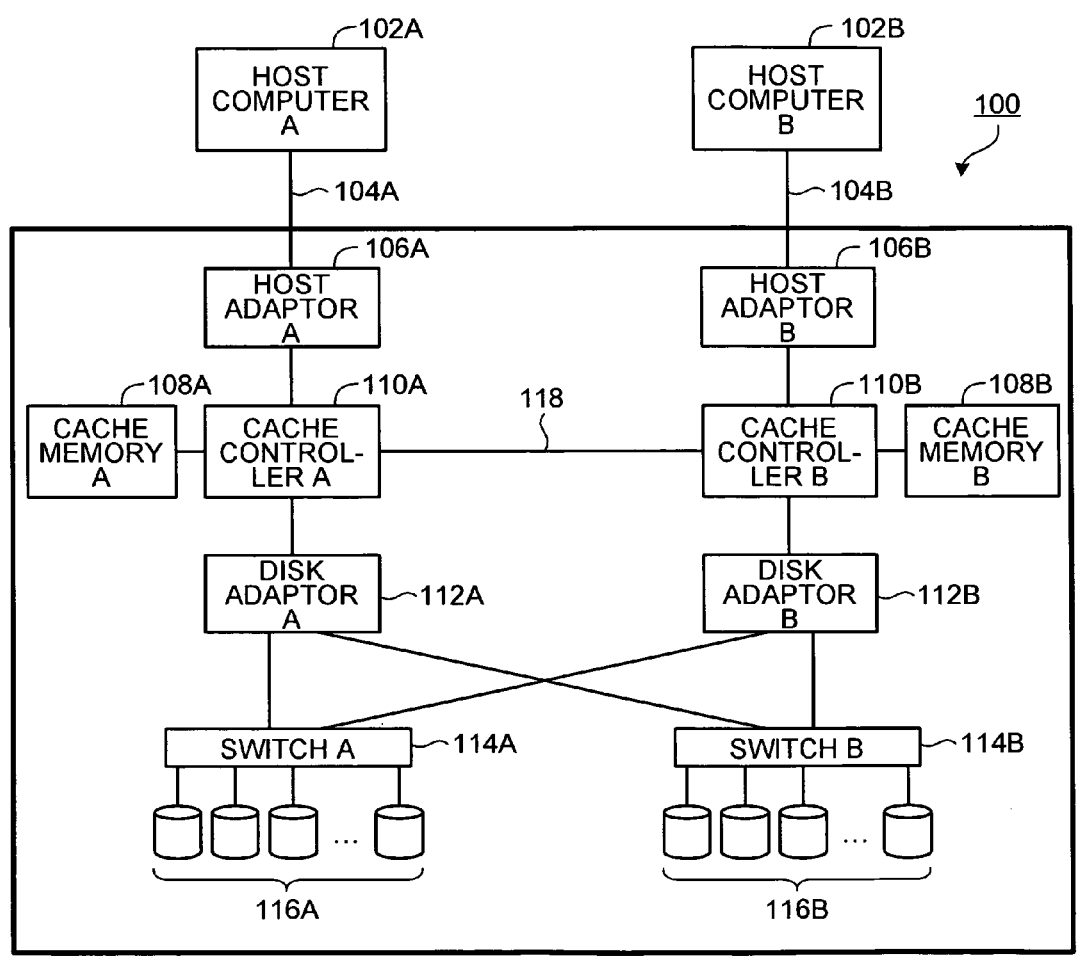
FIG. 14 is a block diagram of a conventional disk array system.

Finally, a transfer process when the BCC-added data having had its validity confirmed by the DMAE•B 20B is transferred from the DMAE•B 20B to the DMAE•A 20A is described by using FIG. 13.

First, upon receiving the BCC-added data transmitted from the DMAE•B 20B with the validity of the BCC-added data having being confirmed (step S401), the link I/F 32A transmits the BCC-added data to the buffer 52A (step S402). Here, the BCC-added data is transmitted from the DMAE•B 20B by units of 520 bytes (512 bytes of the data portion+8 bytes of the BCC portion).

The buffer 52A receives the BCC-added data transmitted from the link I/F 32A, and then writes (stores) therein the BCC-added data therein (step S403). Next, the buffer 52A transmits the stored BCC-added data to the write controlling unit 54A at a predetermined timing (step S404). The write controlling unit 54A receives the BCC-added data transmitted from the buffer 52A, and then transmits the BCC-added data to the memory I/F 26A (step S405). The memory I/F 26A then receives the BCC-added data transmitted from the write controlling unit 54A, and then transmits the BCC-added data to the cache controller A 10A (step S406). With this, a series of a transferring process at the DMAE•A 20A when the BCC-added data with its data validity having been confirmed is transferred from the DMAE•B 20B to the DMAE•A 20A ends. Then, the BCC-added data sent to the cache controller A 10A is written (stored) in the cache memory A 8A. With this, mirroring of the BCC-added data stored in the cache memory B 8B to the cache memory A 8A ends.

Here, description has been exemplarily made to the case of the DMAE•A 20A, but the same goes for the case of the DMAE•B 20B. Also, in the DMAE•B 20B, data validity has been similarly confirmed by a process similar to that described above for the DMAE•A 20A. Therefore, with the above processes being performed, when the BCC-added data stored in the cache memory B 8B is transferred to the cache memory A 8A, mirroring of the corrupted data or the like can be prevented. Therefore, since the BCC-added data that is corrupted or the like and stored in the cache memory B 8B is prevented from being transferred to the cache memory A 8A, the validity of the mirrored BCC-added data can be reliably ensured.

As described above, according to the present embodiment, the DMAE•A 20A performs, at the comparison logic unit 48A, a comparison using the BCC-added data read by the read controlling unit 36A to see whether the BCC located in the last eight bytes of 520 bytes coincides with the values generated in the DMAE•A 20A and stored in the CRC register 42A and the BID count register 44A. Then, the comparison result is checked by the transfer controlling unit 50A, and if the comparison result indicates matching, the transfer controlling unit 50A causes the data block stored in the buffer 38A to be transferred to the cache memory B 8B, which is a mirroring cache memory. On the other hand, if the comparison result indicates mismatching, that is, if data that is corrupted or the like is detected, the transfer controlling unit 50A does not cause the data block and the remaining data stored in the buffer 38A to be transferred.

With such processes, it is possible to reliably prevent the host computer A 2A from being erroneously notified that normal data is stored in the cache memory B BB (normal-end notification) if correct data has not in fact been stored in the disk array apparatus. With this, effects can be achieved in the present embodiment such that validity of the data mirrored in the disk array apparatus 1 is reliably ensured, redundant management of the cache memories is reliably performed, and data reliability can be increased. Therefore, in the present embodiment, correct data can be reliably and easily mirrored, thereby making it possible to obtain an external storage apparatus with a high degree of data reliability.

Description has been exemplarily made to the case where the data transmitted from the host computer A 2A is stored in the cache memory A 8A and the disk drives 16A, and is also mirrored to the cache memory B 8B. However, the same goes for the case where the data transmitted from the host computer B 2B is stored in the cache memory B 8B and the disk drives 16B, and is also mirrored to the cache memory A 8A.

Also, description has been made to the case where two cache memories are present. However, the present invention has the structure in which the number of cache memories is not restricted to two, but can be equal to or more than three.

According to the present invention, when the data stored in the temporary storage unit of the mirroring source is mirrored, the validity of the data is checked. Then, only in the case where the validity of the data has been confirmed, the data is mirrored. Therefore, of the data stored in the temporary storage unit of the mirroring source, only the correct data with its validity having been ensured can be reliably and easily mirrored. Also, it is possible to prevent erroneous data from being stored in the temporary storage unit of the mirror destination. Therefore, an effect can be achieved such that a storage control apparatus capable of controlling stored data with a high degree of reliability can be obtained.

Furthermore, according to the present invention, plural disk apparatuses are provided. Therefore, an effect can be achieved such that the reliability of ensuring data at the occurrence of a failure can be increased.

Moreover, according to the present invention, check code is used for checking data validity. Therefore, an effect can be achieved such that validity of data stored in the temporary storing unit of the mirroring source can be easily and reliably checked.

Furthermore, according to the present invention, by performing comparison to see whether the check code of the check-code-added data coincides with the check code for comparison, validity of data stored in the temporary storing unit of the mirroring source can be checked. Therefore, an effect can be achieved such that validity of the data stored by the temporary storing unit of the mirroring source can be easily and reliably checked.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An external storage apparatus, comprising:
   a plurality of temporary storage units that are managed in a redundant manner by data mirroring, and temporarily store data input from an outside source;
   a temporary-storage control unit that controls input and output of the data to the temporary storage units;
   a mirroring control unit that controls the data mirroring between the temporary storage units, checks, when performing the data mirroring, validity of the data stored in a temporary storage unit of a mirroring source, and executes, when the validity of the data has been confirmed, the data mirroring;
   a disk apparatus that includes a plurality of disks to store the data stored in the temporary storage unit;
   a disk-apparatus control unit that controls input and output of the data to the disk apparatus; and
   a check-code adding unit that adds a first cyclic redundancy check (CRC) code for checking the validity of the data and a first block ID indicating position information of the data to the data input from the outside source, wherein
   the temporary storage unit of the mirroring source temporarily stores the data that has been added with the first CRC code and the first block ID as code-added data,
   the temporary-storage control unit generates a descriptor including a length and address of the code-added data, causes the descriptor to be stored in the temporary storage unit of the mirroring source, and notifies the mirroring control unit that the descriptor has been generated, and
   the mirroring control unit includes:
      a descriptor controlling unit that reads the descriptor from the temporary storage unit of the mirroring source, which triggers the mirroring control unit to check the validity of the data of the code-added data stored in the temporary storage unit of the mirroring source by generating a second CRC code using the data of the code-added data, generating a second block ID using a block ID initial value in the descriptor, and comparing the first CRC code and the first block ID with the second CRC code and the second block ID.

2. The external storage apparatus according to claim 1, wherein the mirroring control unit includes
   a reading unit that reads the data of the code-added data from the temporary storage unit of the mirroring source;
   a storing unit that temporarily stores the data read;
   a second-check-code generating unit that generates the second CRC code and the second block ID for comparison;
   a comparing unit that compares the first CRC code and the first block ID with the second CRC code and the second block ID to determine whether the first CRC code and the first block ID are identical to the second CRC code and the second block ID;
   and a transferring unit that performs, when the comparing unit determines that the first CRC code and the first block ID are identical to the second CRC code and the second block ID, a transfer of the data stored in the storing unit.

3. The external storage apparatus according to claim 1, wherein
   the disk-apparatus control unit receives the code-added data transmitted from the temporary-storage control unit and determines whether the code-added data received is corrupted, and
   if the disk-apparatus control unit determines that the code-added data received is corrupted, the disk-apparatus control unit stores into the disk apparatus other code-added data corresponding to the code-added data, the other code-added data having been stored in the temporary-storage unit of a mirroring destination.

4. The external storage apparatus according to claim 1, wherein
   the disk-apparatus control unit receives the code-added data transmitted from the temporary-storage control unit and determines whether the code-added data received is corrupted, and
   if the disk-apparatus control unit determines that the code-added data received is corrupted, the disk-apparatus control unit restores the code-added data using other code-added data corresponding to the code-added data, the other code-added data having been stored in the temporary-storage unit of a mirroring destination.

5. An external storage apparatus, comprising:
   a plurality of temporary storage units that are managed in a redundant manner by data mirroring, and temporarily store data input from an outside source;

a mirroring control unit that controls the data mirroring between the temporary storage units, checks, when performing the data mirroring, validity of the data stored in a temporary storage unit of a mirroring source, and executes, when the validity of the data has been confirmed, the data mirroring; and a check-code adding unit that adds a first cyclic redundancy check (CRC) code for checking the validity of the data and a first block ID indicating position information of the data to the data input from the outside source to generate code-added data, wherein a descriptor including a length and address of the code-added data is stored in the temporary storage unit of the mirroring source, and the mirroring control unit includes a descriptor controlling unit that reads the descriptor from the temporary storage unit of the mirroring source, which triggers the mirroring control unit to check the validity of the data of the code-added data stored in the temporary storage unit of the mirroring source by generating a second CRC code using the data of the code-added data, generating a second block ID using a block ID initial value in the descriptor, and comparing the first CRC code and the first block ID with the second CRC code and the second block ID.

* * * * *